United States Patent
Shintani et al.

(10) Patent No.: US 10,979,687 B2
(45) Date of Patent: Apr. 13, 2021

(54) USING SUPER IMPOSITION TO RENDER A 3D DEPTH MAP

(71) Applicants: Sony Corporation, Tokyo (JP); Sony Interactive Entertainment Inc., Tokyo (JP)

(72) Inventors: Peter Shintani, San Diego, CA (US); Jose Omar Gonzalez Hernandez, Chula Vista, CA (US); William Clay, San Diego, CA (US); Pablo Antonio Espinosa, San Diego, CA (US); Fred Ansfield, San Diego, CA (US); Bibhudendu Mohapatra, San Diego, CA (US); Keith Resch, San Diego, CA (US); Morio Usami, Tokyo (JP)

(73) Assignee: Sony Corporation, Tokyo (JP)

( * ) Notice: Subject to any disclaimer, the term of this patent is extended or adjusted under 35 U.S.C. 154(b) by 476 days.

(21) Appl. No.: 15/477,369

(22) Filed: Apr. 3, 2017

(65) Prior Publication Data

US 2018/0288385 A1    Oct. 4, 2018

(51) Int. Cl.
| | | |
|---|---|---|
| *H04N 13/128* | (2018.01) |
| *G06T 3/40* | (2006.01) |
| *H04N 13/122* | (2018.01) |
| *H04N 13/156* | (2018.01) |
| *H04N 13/271* | (2018.01) |
| *H04N 5/33* | (2006.01) |

(52) U.S. Cl.
CPC ......... *H04N 13/128* (2018.05); *G06T 3/4053* (2013.01); *H04N 5/33* (2013.01); *H04N 13/122* (2018.05); *H04N 13/156* (2018.05); *H04N 13/271* (2018.05)

(58) Field of Classification Search
CPC .. H04N 13/128; H04N 13/156; H04N 13/271; H04N 2013/0074; G06T 3/4053
USPC .......................................................... 348/46
See application file for complete search history.

(56) References Cited

U.S. PATENT DOCUMENTS

| | | | |
|---|---|---|---|
| 5,228,069 | A  | 7/1993  | Arenson et al. |
| 6,291,816 | B1 | 9/2001  | Liu |
| 6,420,698 | B1 | 7/2002  | Dimsdale |
| 6,442,465 | B2 | 8/2002  | Breed et al. |
| 6,664,501 | B1 | 12/2003 | Troitski |

(Continued)

FOREIGN PATENT DOCUMENTS

| | | |
|---|---|---|
| EP | 2225699 A1 | 9/2010 |
| EP | 2730939 A2 | 5/2014 |
| EP | 2339532 B1 | 4/2015 |

OTHER PUBLICATIONS

Riegler et al., "A Deep Primal-Dual Network for Guided Depth Super-Resolution", Institute for Computer Graphics and Vision, Graz University of TechnologyAustria, Jul. 28, 2016.

(Continued)

*Primary Examiner* — James T Boylan
(74) *Attorney, Agent, or Firm* — John L. Rogitz

(57) ABSTRACT

Each of plural devices includes a laser emitter and a camera for detecting reflections of laser light emitted by the device, so that plural of the devices can generate their own depth maps showing images within the field of view of their cameras. The resolution of each depth map may be improved by accessing a data store of prior images of objects and combining the prior images using super-resolution with current images of the depth maps.

18 Claims, 9 Drawing Sheets

(56) References Cited

U.S. PATENT DOCUMENTS

| | | |
|---|---|---|
| 6,970,183 B1 | 11/2005 | Monroe |
| 7,184,088 B1 | 2/2007 | Ball |
| 7,262,854 B2 | 8/2007 | Imura |
| 7,752,483 B1 | 7/2010 | Muresan et al. |
| 7,791,009 B2 | 9/2010 | Johnston et al. |
| 8,730,309 B2 | 5/2014 | Wilson et al. |
| 8,780,113 B1 | 7/2014 | Ciurea et al. |
| 8,803,950 B2 | 8/2014 | Ren et al. |
| 8,824,827 B2 | 9/2014 | Quan et al. |
| 8,830,555 B2 | 9/2014 | Aksamit et al. |
| 9,031,356 B2 | 5/2015 | Kunkel et al. |
| 9,098,908 B2 | 8/2015 | Kirk et al. |
| 9,214,492 B2 | 12/2015 | Tempel et al. |
| 9,235,928 B2 | 1/2016 | Medioni et al. |
| 9,262,691 B2 | 2/2016 | Kang et al. |
| 9,275,302 B1 | 3/2016 | Yan et al. |
| 9,286,694 B2 | 3/2016 | Kim et al. |
| 9,319,139 B2 | 4/2016 | Effenberger et al. |
| 9,405,008 B2 | 8/2016 | Raskar et al. |
| 9,426,450 B1 | 8/2016 | Zhang et al. |
| 9,435,891 B2 | 9/2016 | Oggier |
| 9,483,835 B2 | 11/2016 | Liang et al. |
| 9,542,749 B2 | 1/2017 | Freedman et al. |
| 9,557,166 B2 | 1/2017 | Thuries et al. |
| 9,618,613 B2 | 4/2017 | Murakami et al. |
| 9,760,837 B1 | 9/2017 | Nowozin et al. |
| 9,806,813 B2 | 10/2017 | Liu et al. |
| 9,858,673 B2 | 1/2018 | Ciurea et al. |
| 9,860,618 B2 | 1/2018 | Liu et al. |
| 9,995,578 B2 | 6/2018 | Ge et al. |
| 10,142,612 B2 | 11/2018 | Ge et al. |
| 10,559,127 B2 * | 2/2020 | Wei .................... G06T 17/20 |
| 10,650,542 B2 * | 5/2020 | Lee .................... G06T 5/006 |
| 2004/0141170 A1 | 7/2004 | Jamieson et al. |
| 2004/0141753 A1 | 7/2004 | Euw et al. |
| 2004/0208272 A1 | 10/2004 | Moursund et al. |
| 2005/0031166 A1 | 2/2005 | Fujimura et al. |
| 2005/0207755 A1 | 9/2005 | Rabbat et al. |
| 2005/0226214 A1 | 10/2005 | Keslassy et al. |
| 2006/0221241 A1 | 10/2006 | Okumichi et al. |
| 2006/0239558 A1 | 10/2006 | Rafii et al. |
| 2007/0024614 A1 | 2/2007 | Tam et al. |
| 2007/0279415 A1 | 12/2007 | Sullivan et al. |
| 2008/0152247 A1 | 6/2008 | Oh et al. |
| 2009/0080885 A1 | 3/2009 | Mehrotra et al. |
| 2009/0190853 A1 | 7/2009 | Noh |
| 2010/0302365 A1 | 12/2010 | Finocchio et al. |
| 2011/0025843 A1 | 2/2011 | Oggier et al. |
| 2011/0188773 A1 | 8/2011 | Wei et al. |
| 2011/0243570 A1 | 10/2011 | Kim et al. |
| 2012/0032833 A1 | 2/2012 | Milligan et al. |
| 2012/0044476 A1 | 2/2012 | Earhart et al. |
| 2012/0056982 A1 | 3/2012 | Katz et al. |
| 2012/0069009 A1 * | 3/2012 | Shimoyama .......... H04N 13/261 345/419 |
| 2012/0168605 A1 | 7/2012 | Milanovic et al. |
| 2012/0182394 A1 | 7/2012 | Bae et al. |
| 2012/0248514 A1 | 10/2012 | Korekado et al. |
| 2012/0293615 A1 | 11/2012 | Chen et al. |
| 2012/0306876 A1 | 12/2012 | Shotton et al. |
| 2013/0051516 A1 | 2/2013 | Yang et al. |
| 2013/0129224 A1 | 5/2013 | Katz et al. |
| 2013/0195083 A1 | 8/2013 | Kim et al. |
| 2013/0207970 A1 | 8/2013 | Shpunt et al. |
| 2013/0278604 A1 * | 10/2013 | Georgis ................ H04N 5/232 345/428 |
| 2013/0293684 A1 | 11/2013 | Becker et al. |
| 2013/0329012 A1 | 12/2013 | Bartos et al. |
| 2014/0058367 A1 | 2/2014 | Dantus |
| 2014/0079288 A1 | 3/2014 | Lee et al. |
| 2014/0092221 A1 * | 4/2014 | Nagai ................. H04N 13/106 348/51 |
| 2014/0168424 A1 | 6/2014 | Attar et al. |
| 2014/0198977 A1 | 7/2014 | Narasimha et al. |
| 2014/0226984 A1 | 8/2014 | Roberts et al. |
| 2014/0240467 A1 | 8/2014 | Petyushko et al. |
| 2014/0253679 A1 | 9/2014 | Guigues et al. |
| 2014/0253691 A1 * | 9/2014 | Holz ................. H04N 13/0239 348/47 |
| 2014/0293993 A1 | 10/2014 | Ryhorchuk |
| 2014/0333728 A1 | 11/2014 | Navab et al. |
| 2014/0355901 A1 | 12/2014 | Tezaur |
| 2014/0375851 A1 | 12/2014 | Lee et al. |
| 2014/0376768 A1 | 12/2014 | Troy et al. |
| 2015/0002636 A1 | 1/2015 | Brown |
| 2015/0022643 A1 | 1/2015 | Stetson et al. |
| 2015/0024336 A1 * | 1/2015 | Blassnig ................ G06T 15/06 433/29 |
| 2015/0036926 A1 | 2/2015 | Choi et al. |
| 2015/0070489 A1 | 3/2015 | Hudman et al. |
| 2015/0130903 A1 | 5/2015 | Thompson et al. |
| 2015/0130904 A1 | 5/2015 | Bae et al. |
| 2015/0171968 A1 | 6/2015 | Featherston et al. |
| 2015/0248765 A1 | 9/2015 | Criminisi et al. |
| 2015/0254811 A1 | 9/2015 | Sahu et al. |
| 2015/0294686 A1 | 10/2015 | Autioniemi |
| 2015/0309663 A1 | 10/2015 | Seo et al. |
| 2015/0339471 A1 | 11/2015 | Bennett et al. |
| 2015/0371393 A1 | 12/2015 | Ramachandra et al. |
| 2015/0373322 A1 * | 12/2015 | Goma ................... G03B 17/38 348/21 |
| 2015/0378023 A1 | 12/2015 | Royo et al. |
| 2016/0012633 A1 | 1/2016 | Wei et al. |
| 2016/0097851 A1 | 4/2016 | Zhang et al. |
| 2016/0098847 A1 | 4/2016 | Crnokrak |
| 2016/0099777 A1 | 4/2016 | Liu et al. |
| 2016/0124089 A1 | 5/2016 | Meinherz et al. |
| 2016/0173869 A1 * | 6/2016 | Wang ....................... G06T 5/50 348/187 |
| 2016/0191759 A1 | 6/2016 | Somanath et al. |
| 2016/0239725 A1 | 8/2016 | Liu et al. |
| 2016/0291160 A1 | 10/2016 | Zweigle et al. |
| 2016/0328828 A1 | 11/2016 | Zhang et al. |
| 2016/0344967 A1 | 11/2016 | Barnes et al. |
| 2017/0061701 A1 | 3/2017 | Mittal et al. |
| 2017/0188017 A1 | 6/2017 | Hall |
| 2017/0201738 A1 | 7/2017 | Lacaze et al. |
| 2017/0264880 A1 | 9/2017 | Zolotov |
| 2017/0277180 A1 | 9/2017 | Baer et al. |
| 2017/0332750 A1 | 11/2017 | Gharabegian |
| 2017/0372527 A1 * | 12/2017 | Murali .................... G06T 19/20 |
| 2017/0374342 A1 | 12/2017 | Zhao |
| 2018/0033357 A1 | 2/2018 | Li et al. |
| 2018/0034579 A1 | 2/2018 | Liu et al. |
| 2018/0053284 A1 | 2/2018 | Rodriguez et al. |
| 2018/0100928 A1 | 4/2018 | Keilaf et al. |
| 2018/0124371 A1 * | 5/2018 | Kamal ................... G01B 11/00 |
| 2018/0173990 A1 | 6/2018 | Shintani et al. |
| 2018/0176483 A1 | 6/2018 | Knorr et al. |
| 2018/0190014 A1 | 7/2018 | Yarborough et al. |
| 2018/0234617 A1 | 8/2018 | Przyborski |

OTHER PUBLICATIONS

Schuon et al., "High-Quality Scanning Using Time-of-Flight Depth Superresolution", Stanford University, 2008.

Derek Chan, Hylke Buisman, Christian Theobalt, Sebastian Thrun, "A Noise-Aware Filter for Real-Time Depth Upsampling", Oct. 5, 2008, retrieved from https://hal.inria.fr/inria-00326784.

Quang H. Nguyen, Minh N. Do, Sanjay J. Patel, "Depth image-based rendering from multiple cameras with 3D propagation algorithm", May 27, 2009.

Shuran Song, Jianxiong Xiao, "Sliding Shapes for 3D Object Detection in Depth Images", Abstract, Sep. 2014.

Yo-Sung Ho, Yun-Suk Kang, "Multi-View Depth Generation using Multi-Depth Camera System", Gwangju Institute of Science and Technology, Jan. 4, 2016.

Peter Shintani, Jose Omar Gonzalez Hernandez, William Clay, Pablo Antonio Espinosa, Fred Ansfield, Bibhudendu Mohapatra, Keith Resch, Morio Usami, file history of related U.S. Appl. No. 15/383,392, filed Dec. 19, 2016.

(56) References Cited

OTHER PUBLICATIONS

Peter Shintani, Jose Omar Gonzalez Hernandez, William Clay, Pablo Antonio Espinosa, Fred Ansfield, Bibhudendu Mohapatra, Keith Resch, Morio Usami, file history of related U.S. Appl. No. 15/370,197, filed Dec. 6, 2016.
Peter Shintani, Jose Omar Gonzalez Hernandez, William Clay, Pablo Antonio Espinosa, Fred Andfield, Bibhudendu Mohapatra, Keith Resch, Morio Usami, file history of related U.S. Appl. No. 15/371,433, filed Dec. 7, 2016.
Peter Shintani, Jose Omar Gonzalez Hernandez, William Clay, Pablo Antonio Espinosa, Fred Ansfield, Bibhudendu Mohapatra, Keith Resch, Morio Usami, file history of related U.S. Appl. No. 15/383,683, filed Dec. 19, 2016.
Peter Shintani, Jose Omar Gonzalez Hernandez, William Clay, Pablo Antonio Espinosa, Fred Ansfield, Bibhudendu Mohapatra, Keith Resch, Morio Usami, file history of related U.S. Appl. No. 15/432,674, filed Feb. 14, 2017.
Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", related U.S. Appl. No. 15/383,392, Non-Final Office Action dated Apr. 19, 2018.
Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", related U.S. Appl. No. 15/383,392, Applicant's response to Non-Final Office Action filed Apr. 25, 2018.
Ho, Edmond S.L. et al., "Improving Posture Classification Accuracy for Depth Sensor-Based Human Activity Monitoring in Smart Environments", Jul. 2016, retrieved from http://www.sciencedirect.com/science/article/pii/S1077314216000138.
Peter Shintani, Morio Usami, Kissei Matsumoto, Kazuyuki Shikama, Bibhudendu Mohapatra, Keith Resch, "3D Depth Map", file history of related U.S. Appl. No. 15/590,497, filed May 9, 2017.
Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Non-Final Office Action dated Apr. 5, 2018.
Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Applicant's response to Non-Final Office Action filed Apr. 16, 2018.
Daniel Freedman, Eyal Krupka, Yoni Smolin, Ido Leichter, Mirko Schmidt, "SRA: Fast Removal of General Multipath for ToF Sensors", Microsoft Research, Microsoft Corporation, Mar. 24, 2014.
Peter Shintani, Morio Usami, Kazuyuki Shikama, Keith Resch, "Generating 3D Depth Map Using Parallax", file history of related U.S. Appl. No. 15/798,914, filed Oct. 31, 2017.
Nathan Silberman, Rob Fergus, "Indoor Scene Segmentation using a Structured Light Sensor", Dept. of Computer Science, Nov. 6, 2011, Courant Institute, New York University, pp. 601-608.
Peter Shintani, Morio Usami, Kissei Matsumoto, Kazuyuki Shikama, Bibhudendu Mohapatra, Keith Resch, "3D Depth Map", related U.S. Appl. No. 15/590,497, Non-Final Office Action dated Jun. 15, 2018.
Peter Shintani, Morio Usami, Kissei Matsumoto, Kazuyuki Shikama, Bibhudendu Mohapatra, Keith Resch, "3D Depth Map", related U.S. Appl. No. 15/590,497, Applicant's response to Non-Final Office Action filed Jun. 20, 2018.
Michael Taylor, Glenn Black, Javier Fernandez Rico, "Multipoint Slam Capture", file history of related U.S. Appl. No. 16/019,140, filed Jun. 26, 2018.
Peter Shintani, Jose Omar Gonzalez Hernandez, William Clay, Pablo Antonio Espinosa, Fred Ansfield, Bibhudendu Mohapatra, Keith Resch, Morio Usami, "Using Multiple Cameras to Stitch a Consolidated 3D Depth Map", related U.S. Appl. No. 15/383,683, Non-Final Office Action dated Jul. 12, 2018.
Peter Shintani, Jose Omar Gonzalez Hernandez, William Clay, Pablo Antonio Espinosa, Fred Ansfield, Bibhudendu Mohapatra, Keith Resch, Morio Usami, "Using Multiple Cameras to Stitch a Consolidated 3D Depth Map", related U.S. Appl. No. 15/383,683, Applicants response to Non-Final Office Action filed Jul. 16, 2018.
Peter Shintani, Jose Omar Gonzalez Hernandez, William Clay, Pablo Antonio Espinosa, Fred Ansfield, Bibhudendu Mohaptra, Keith Resch, Morio Usami, "Using Pattern Recognition to Reduce Noise in a 3D Map", related U.S. Appl. No. 15/383,392, Applicant's response to Final Office Action filed Sep. 14, 2015.
Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Final Office Action dated Sep. 10, 2018.
Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Applicant's response to Final Office Action filed Sep. 12, 2018.
Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", related U.S. Appl. No. 15/383,392, Final Office Action dated Sep. 12, 2018.
Peter Shintani, Morio Usami, Kissei Matsumoto, Kazuyuki Shikama, Bibhudendu Mohapatra, Keith Resch, "3D Depth Map", related U.S. Appl. No. 15/590,497, Final Office Action dated Nov. 19, 2018.
Peter Shintani, Morio Usami, Kissei Matsumoto, Kazuyuki Shikama, Bibhudendu Mohapatra, Keith Resch, "3D Depth Map", related U.S. Appl. No. 15/590,497, Applicant's response to Final Office Action filed Dec. 6, 2018.
Jinbeum Jang, Sangwoo Park, Jieun Jo, Joonki Paik, "Depth map generation using a single image sensor with phase masks", Image Processing and Intelligent System Laboratory Graduate School of Advanced Imaging Science and Film, Chung-Ang University, Seoul, South Korea, Optical Society of America, 2016.
Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", related U.S. Appl. No. 15/371,433, Non-Final Office Action dated Jan. 10, 2019.
Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", related U.S. Appl. No. 15/371,433, Applicant's response to Non-Final Office Action filed Jan. 17, 2019.
Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", related U.S. Appl. No. 15/371,433, Final Office Action dated Apr. 2, 2019.
Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", related U.S. Appl. No. 15/371,433, Applicant's response to Final Office Action filed Apr. 15, 2019.
Peter Shintani, Morio Usami, Kissei Matsumoto, Kazuyuki Shikama, Bibhudendu Mohapatra, Keith Resch, "3D Depth Map", related U.S. Appl. No. 15/590,497, Non-Final Office Action dated Mar. 25, 2019.
Peter Shintani, Morio Usami, Kissei Matsumoto, Kazuyuki Shikama, Bibhudendu Mohapatra, Keith Resch, "3D Depth Map", related U.S. Appl. No. 15/590,497, Applicant's response to Non-Final Office Action filed Apr. 2, 2019.
Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Non-Final Office Action dated Mar. 21, 2019.
Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized

(56) References Cited

OTHER PUBLICATIONS

Devices", related U.S. Appl. No. 15/370,197, Applicant's response to Non-Final Office Action filed Apr. 1, 2019.

Peter Shintani, Jose Omar Gonzalez Hernandez, William Clay, Pablo Antonio Espinosa, Fred Ansfield, Bibhudendu Mohapatra, Keith Resch, Morio Usami, "Using Micro Mirrors to Improve the Field of View of a 3D Depth Map", related U.S. Appl. No. 15/432,674, Non-Final Office Action dated Feb. 14, 2019.

Peter Shintani, Jose Omar Gonzalez Hernandez, William Clay, Pablo Antonio Espinosa, Fred Ansfield, Bibhudendu Mohapatra, Keith Resch, Morio Usami, "Using Micro Mirrors to Improve the Field of View of a 3D Depth Map", related U.S. Appl. No. 15/432,674, Applicant's response to Non-Final Office Action filed Feb. 20, 2019.

Shintani et al., "3D Depth Map", related U.S. Appl. No. 15/590,497, Applicant's response to Non-Final Office Action filed Aug. 7, 2019.

Shintani et al., "3D Depth Map", related U.S. Appl. No. 15/590,497, Non-Final Office Action dated Jul. 29, 2019.

Shintani et al., "Generating 3D Depth Map Using Parallax", related U.S. Appl. No. 15/798,914, Applicant's response to Non-Final Office Action filed Jul. 12, 2019.

Shintani et al., "Generating 3D Depth Map Using Parallax", related U.S. Appl. No. 15/798,914, Non-Final Office Action dated Jul. 9, 2019.

He et al, "Iterative Transduction Learning for Automatic Image Segmentation and Matting with RGB-D Data", Elsevier, Mar. 2014.

Jang et al, "Depth Map Generation Using a Single Image Sensor with Phase Masks", Chang-Ang University, Seoul, South Korea, Jun. 2016.

Kim et al, "Multi-focusing and Depth Estimation Using a Color Shift Model-Based Computational Camera", IEEE Transactions on Image Processing, vol. 21, No. 9, Sep. 2012.

Li et al, "Brain-Inspired Framework for Fusion of Multiple Depth Cues", IEEE Transactions on Circuits and Systems for Video Technology, vol. 23, No. 7, Jul. 2013.

Roy et al, "Denoising 3D Models with Attributes Using Soft Thresholding", Bourgogne University, France, 2004.

Shintani et al, "Color Noise Reduction in 3D Depth Map", related U.S. Appl. No. 15/371,433, Non-Final Office Action dated Jun. 21, 2019.

Shintani et al, "Color Noise Reduction in 3D Depth Map", related U.S. Appl. No. 15/371,433, Non-Final Office Action response filed Jun. 28, 2019.

Shintani et al, "Using Micro Mirrors to Improve the Field of View of a 3D Depth Map", related U.S. Appl. No. 15/432,674, Final Office Action dated May 3, 2019.

Shintani et al, "Using Micro Mirrors to Improve the Field of View of a 3D Depth Map", related U.S. Appl. No. 15/432,674, Applicant's response to Final Office Action filed May 31, 2019.

* cited by examiner

USING SUPER IMPOSITION TO RENDER A 3D DEPTH MAP

FIELD

The present application relates to technically inventive, non-routine solutions that are necessarily rooted in computer technology and that produce concrete technical improvements.

BACKGROUND

When multiple computerized devices interact with each other at close range, they may employ sensors such as cameras and laser range finders to map their environment. As understood herein, three dimensional (3D) depth maps may be generated by each device of the other devices or objects within line of sight. Such 3D depth maps are generated typically using "time of flight" principles, i.e., by timing the periods from laser transmission to reception of each reflection, with regions of an object further away taking longer for the light to propagate to it and then return to a detector. The time of flight for each detected reflection by a sensor, typically a complementary metal oxide semiconductor (CMOS) camera, is converted to distance to generate the depth map.

As understood herein, a problem with time of flight 3D camera mapping systems is the illumination of the camera's field of view by a laser. As the distance increases (depth), the reflected laser power drops so the noise increases. This means that the accuracy of the depth map decreases and the measurement time increases (averaging). A brute force response to this problem would be to increase the illumination by increasing the laser power, but this method raises safety issues and power consumption issues.

SUMMARY

As envisioned herein, a system of multiple independent computer devices which may or may not be mobile can be used in an example indoor setting, potentially on a flat surface. Each device may include a laser emitter and a camera for detecting reflections of laser light emitted by the device, so that plural of the devices can generate their own depth maps showing images within the field of view of their cameras.

The present application discloses the use of video signal processing to improve 3D depth map image quality. The higher resolution of the camera sensor, the smaller each pixel will be and the lower the number of photons that are captured, resulting in a lower signal to noise ratio. To counterbalance this, present principles achieve a compromise in sensor resolution by applying Super Resolution scaling technology to the 3D bit map of a lower resolution. In example embodiments, super resolution principles discussed in the present assignee's U.S. Pat. No. 8,587,696, incorporated herein by reference, may be used. In some examples, super resolution principles discussed in U.S. Pat. Nos. 6,208,765 and 7,218,751 are also incorporated herein by reference, may be used. In some examples, geometric/image processing super resolution may be used in preference to optical or diffractive super resolution.

Accordingly, in one aspect a device includes at least one computer medium that is not a transitory signal and that in turn includes instructions executable by at least one processor to generate, using a first device, at least a first current image of at least a second device in a field of view of a camera. The first image can be a first 3D depth map. The instructions are executable to access a data structure of stored images and responsive to identifying a match between the first image and a first stored image in the data structure, combine the first image and the first stored image to render a modified depth map.

In example embodiments, the instructions may be executable to identify the match between the first image and a first stored image at least in part using at least one stored characteristic of the first stored image. The stored characteristic can include a shape of an object in the first stored image and/or an edge of an object in the first stored image.

If desired, the instructions may be executable to combine the first image and the first stored image by superimposition to render the modified depth map. The modified depth map has a higher resolution than the depth map established by the first image. Superimposition of the first image and first stored image may be undertaken using super-resolution. In non-limiting examples, the instructions are executable to remove a portion of at least one of the first image and/or first stored image to render a respective cropped image prior to combining the first image and the first stored image to render the modified depth map.

In another aspect, an assembly includes plural computerized devices. Each computerized device includes at least one laser emitter configured to output signals useful for generating at least one three dimensional (3D) depth map. At least a first one of the computerized devices is programmed with instructions to generate at least a first current image of at least one object in a field of view of a camera associated with the first one of the computerized devices. The instructions are executable to access a data structure of stored images and responsive to identifying a match between the first image and a first stored image in the data structure, combine the first image and the first stored image to render a modified three dimensional (3D) depth map.

In another aspect, a method includes generating a three dimensional (3D) depth map of at least one object in space. The method also includes improving a resolution of the 3D depth map by accessing a data store of prior images of objects and combining at least one the prior images using super-resolution with the 3D depth map to render a modified 3D depth map.

The details of the present application, both as to its structure and operation, can be best understood in reference to the accompanying drawings, in which like reference numerals refer to like parts, and in which:

DETAILED DESCRIPTION

Figure 1:
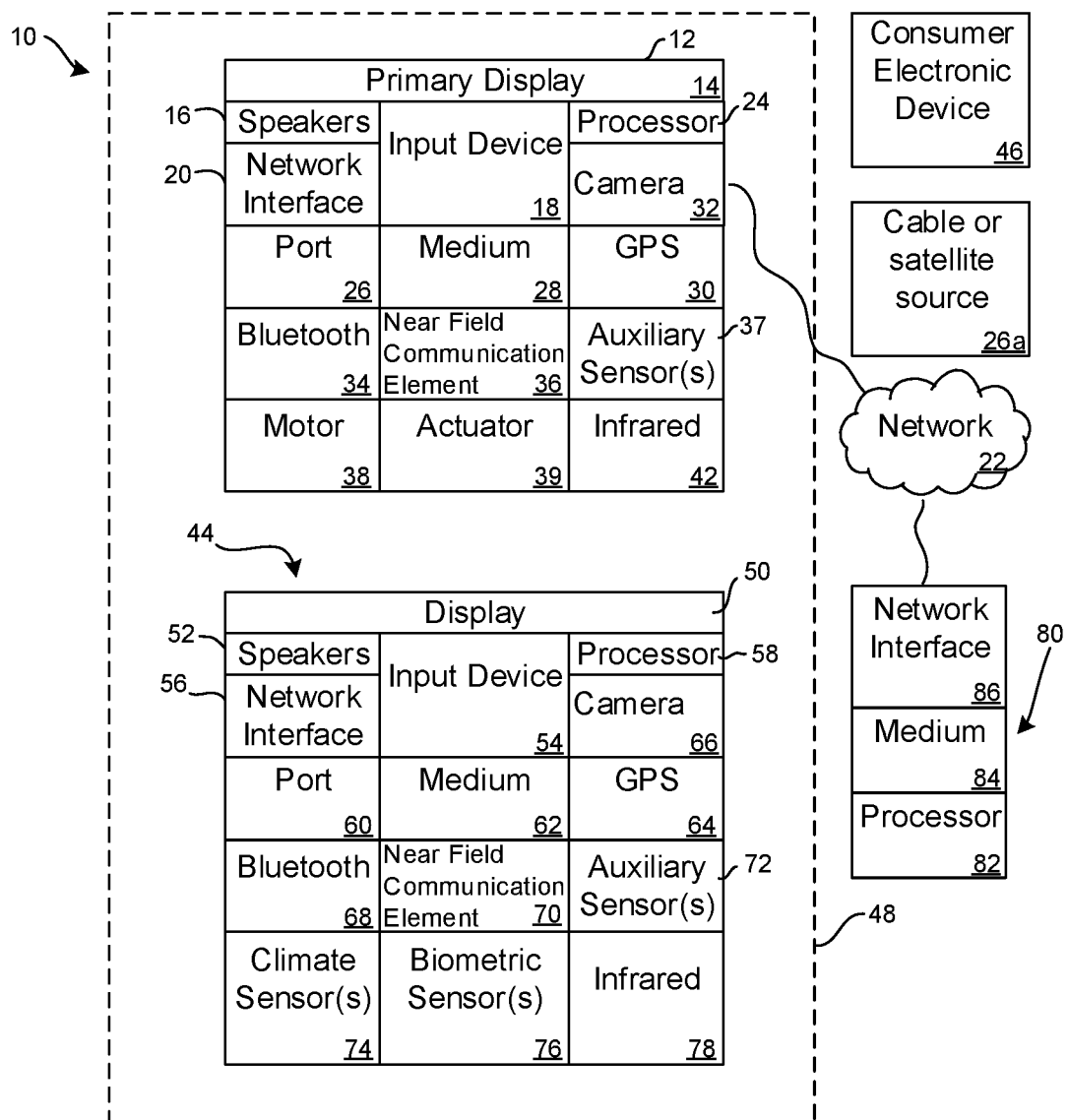
FIG. 1 is a block diagram of an example device.

This disclosure relates generally to computer ecosystems including aspects of multiple computerized devices. A system herein including computerized devices may include server and client components, connected over a network such that data may be exchanged between the client and server components. The client components may include one or more computing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community including but not limited to social networks to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example computerized device 12.

The computerized device 12 may be an Android®-based system. The computerized device 12 alternatively may also include a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the computerized device 12 and/or other computers described herein is configured to undertake present principles (e.g. communicate with other CE devices to undertake present principles, execute the logic described herein, and perform any other functions and/or operations described herein).

Accordingly, to undertake such principles the computerized device 12 can be established by some or all of the components shown in FIG. 1. For example, the computerized device 12 can include one or more displays 14 that may be implemented by a high definition or ultra-high definition "4K" or higher flat screen and that may or may not be touch-enabled for receiving user input signals via touches on the display. The computerized device 12 may include one or more speakers 16 for outputting audio in accordance with present principles, and at least one additional input device 18 such as e.g. an audio receiver/microphone for receiving input sound including but not limited to audible commands to the computerized device 12 to control the computerized device 12. The example computerized device 12 may also include one or more network interfaces 20 for communication over at least one network 22 such as the Internet, a WAN, a LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the computerized device 12 to undertake present principles, including the other elements of the computerized device 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the computerized device 12 may also include one or more input ports 26 such as, e.g., a high definition multimedia interface (HDMI) port or a USB port to physically connect (e.g. using a wired connection) to another CE device and/or a headphone port to connect headphones to the computerized device 12 for presentation of audio from the computerized device 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below.

The computerized device 12 may further include one or more computer memories 28 such as disk-based or solid state storage that are not transitory signals, in some cases embodied in the chassis of the device as standalone devices or as a personal video recording device (PVR) or video disk player either internal or external to the chassis of the device for playing back AV programs or as removable memory media. Also in some embodiments, the computerized device 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the computerized device 12 is disposed in conjunction with the processor 24. However, it is to be understood that another suitable position receiver other than a cellphone receiver, GPS receiver and/or altimeter may be used in accordance with present principles to e.g. determine the location of the computerized device 12 in e.g. all three dimensions.

In some embodiments the computerized device 12 may include one or more cameras 32 that may be, e.g., a thermal imaging camera, a digital camera such as a webcam, and/or a camera integrated into the computerized device 12 and controllable by the processor 24 to gather pictures/images and/or video in accordance with present principles. Also included on the computerized device 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the computerized device 12 may include one or more auxiliary sensors 37 (e.g., a motion sensor such as an accelerometer, gyroscope, cyclometer, or a magnetic sensor, an infrared (IR) sensor for receiving IR commands or other signals from a remote control or laser, an optical sensor, a speed and/or cadence sensor, a gesture sensor (e.g. for sensing gesture command), etc.) providing input to the processor 24. The computerized device 12 may include one or more motors 38, which may be a battery-powered motor, and one or more actuators 39 coupled to the motor 38 and configured to cause the device 12 to ambulate. In one example, the actuator 39 is a simple axle-and-wheel actuator that can be energized by the motor 38 to cause the device 12 to roll across a surface. In another example the actuator 39 may include one or more linear actuators with joints to cause the device 12 to move in a robotic, walking-type fashion on multiple legs. These are but two examples of motion actuators that can be included in the device 12.

In addition to the foregoing, it is noted that the computerized device 12 may also include an infrared (IR) transmitter and/or IR receiver and/or IR transceiver 42 such as a laser or an IR data association (IRDA) device. A battery (not shown) may be provided for powering the computerized device 12.

Still referring to FIG. 1, in addition to the computerized device 12, the system 10 may include one or more other computer device types that may include some or all of the components shown for the computerized device 12 and that may wirelessly communicate with the device 12 to control it. In one example, a first device 44 and a second device 46 are shown and may include similar components as some or all of the components of the computerized device 12. Fewer or greater devices may be used than shown.

In the example shown, to illustrate present principles all three devices 12, 44, 46 are assumed to be members of a local network in, e.g., a dwelling 48, illustrated by dashed lines.

The example non-limiting first device 44 may include one or more touch-sensitive surfaces 50 such as a touch-enabled video display for receiving user input signals via touches on the display. The first device 44 may include one or more speakers 52 for outputting audio in accordance with present principles, and at least one additional input device 54 such as e.g. an audio receiver/microphone for e.g. entering audible commands to the first device 44 to control the device 44. The example first device 44 may also include one or more network interfaces 56 for communication over the network 22 under control of one or more processors 58. Thus, the interface 56 may be, without limitation, a Wi-Fi transceiver, which is an example of a wireless computer network interface, including mesh network interfaces. It is to be understood that the processor 58 controls the first device 44 to undertake present principles, including the other elements of the first device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first device 44 may also include one or more input ports 60 such as, e.g., a HDMI port or a USB port to physically connect (e.g. using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid state storage. Also in some embodiments, the first device 44 can include a position or location receiver such as but not limited to a cellphone and/or GPS receiver and/or altimeter 64 that is configured to e.g. receive geographic position information from at least one satellite and/or cell tower, using triangulation, and provide the information to the device processor 58 and/or determine an altitude at which the first device 44 is disposed in conjunction with the device processor 58. However, it is to be understood that another suitable position receiver other than a cellphone and/or GPS receiver and/or altimeter may be used in accordance with present principles to e.g. determine the location of the first device 44 in e.g. all three dimensions.

Continuing the description of the first device 44, in some embodiments the first device 44 may include one or more cameras 66 that may be, e.g., a thermal imaging camera, a digital camera such as a webcam, etc. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first device 44 may include still other sensors such as e.g. one or more climate sensors 74 (e.g. barometers, humidity sensors, wind sensors, light sensors, temperature sensors, etc.) and/or one or more biometric sensors 76 providing input to the device processor 58. In addition to the foregoing, it is noted that in some embodiments the first device 44 may also include an infrared (IR) transmitter and/or IR receiver and/or IR transceiver 78 such as a laser or an IR data association (IRDA) device. A battery may be provided for powering the first device 44. The device 44 may communicate with the computerized device 12 through any of the above-described communication modes and related components.

The second device 46 may include some or all of the components described above.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers, controllers, and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
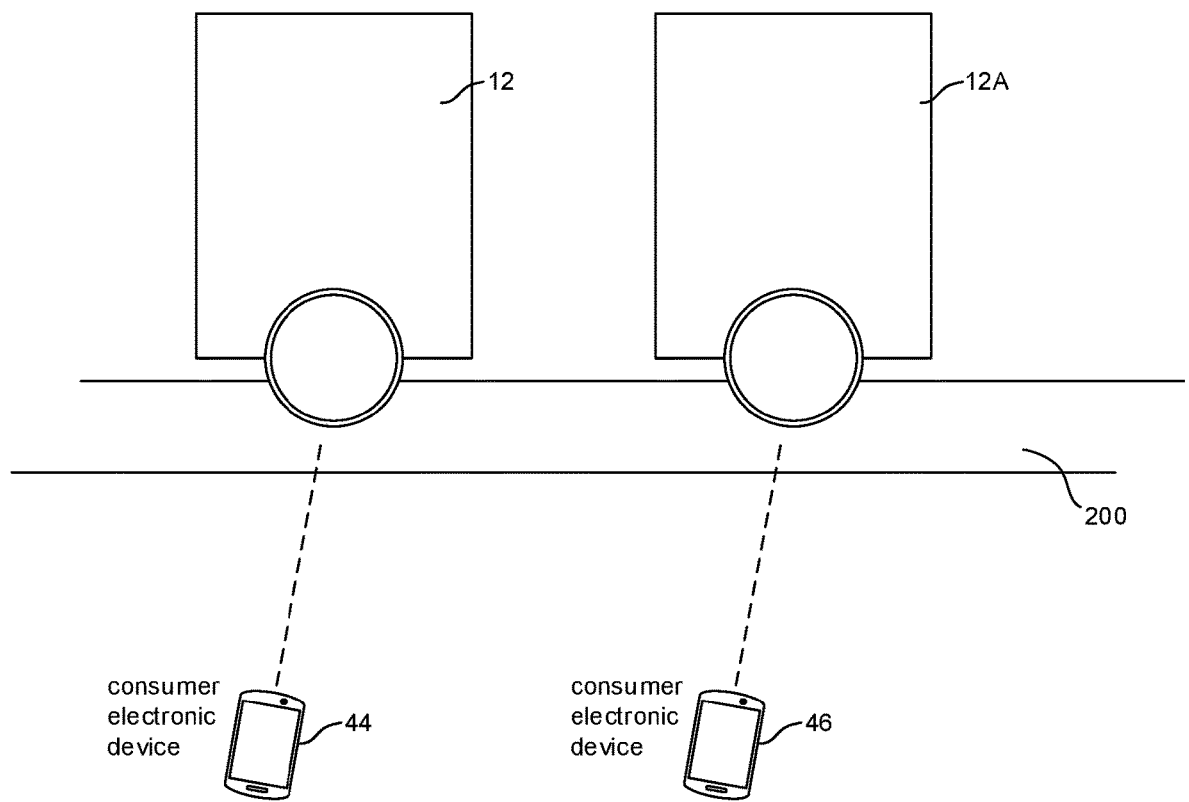
FIG. 2 is a block diagram of a system showing two devices, it being understood that more than two devices may be used.

FIG. 2 shows that multiple devices 12, 12A may be controlled by respective CE devices 44, 46 to interact on a surface 200 such as a flat planar surface.

Figure 3:
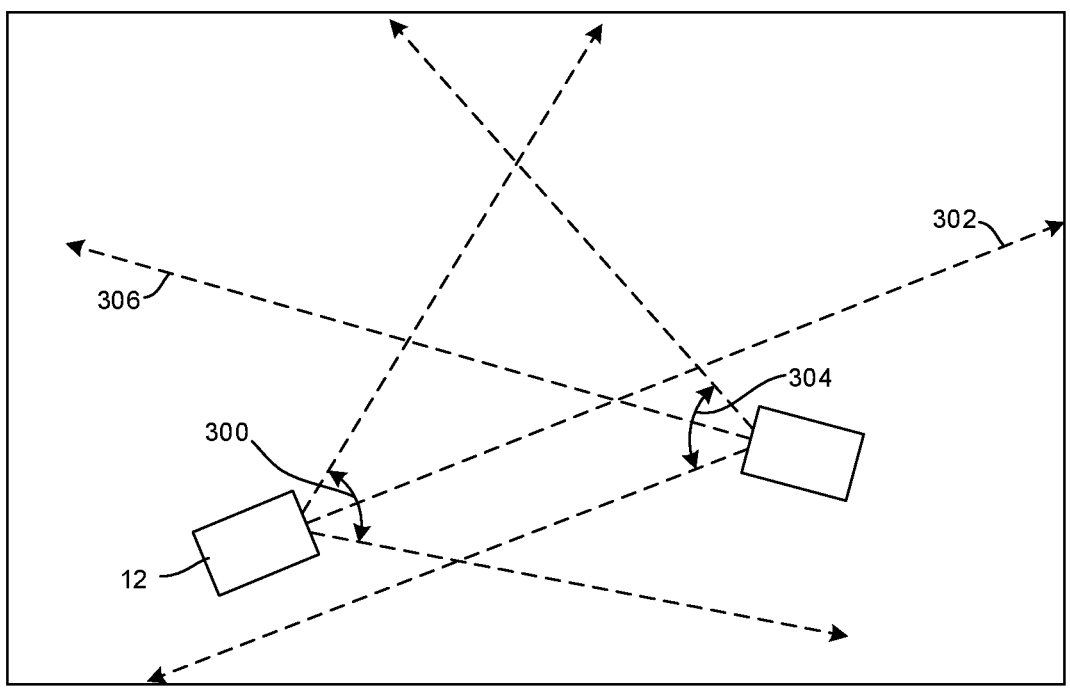
FIG. 3 is a schematic top view of two devices showing field of view of the devices.

FIG. 3 shows that the first device 12 may have a camera providing a field of view (FOV) with a FOV angle 300. The first device 12 may emit laser range-finding light such as IR light along one or more range finding axes 302. The camera may be implemented by a complementary metal oxide semiconductor (CMOS) camera that can detect both visible and infrared light so as to be able to produce still or video images along with detections of laser reflections for purposes of generating a depth map.

Likewise, the second device 12A may have a camera providing a field of view (FOV) with a FOV angle 304. The first device 12 may emit laser range-finding light such as IR light along one or more range finding axes 306. More than two devices may be used. In the example shown, each device is within the FOV of the other device, and the FOVs of the devices overlap as shown. The devices 12, 12A emitting their respective laser beams establish an optical micro-mesh.

Figure 4:
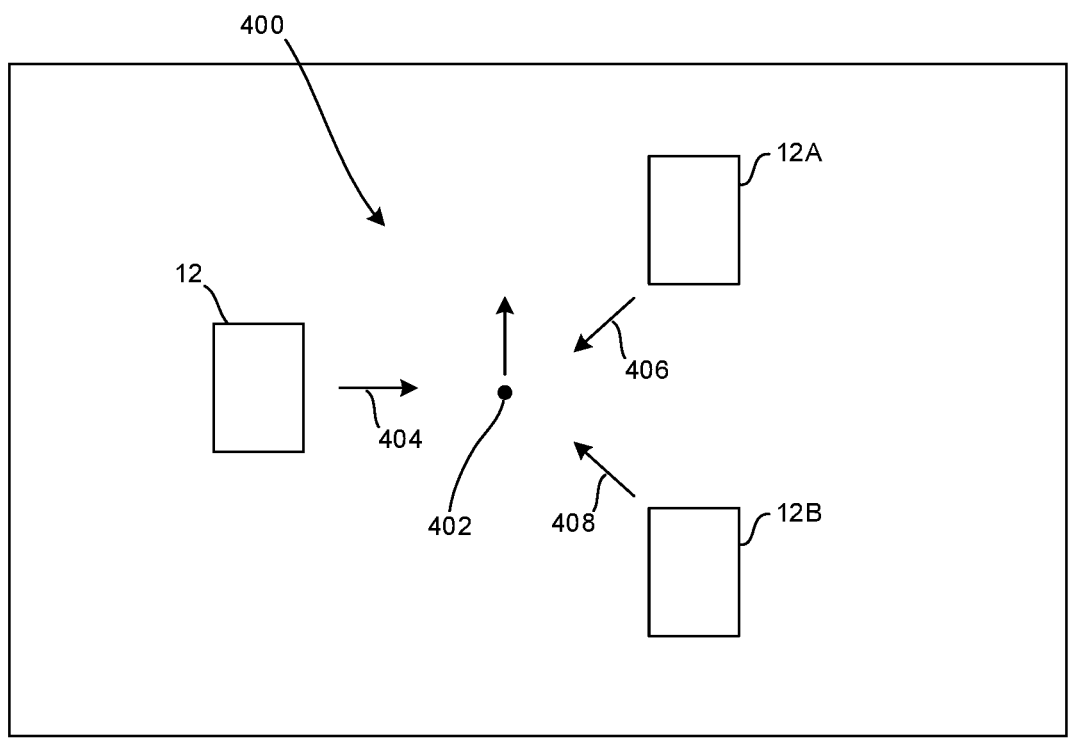
FIG. 4 is a schematic top view of three devices.

FIG. 4 illustrates a system 400 with three devices 12, 12A, 12B implemented by any of the devices described herein. As divulged further below, each device generates its own depth map by imaging the other devices within its field of view. The depth maps are aggregated together for a reference location that may be user-defined. In the example shown, the disclosure below assumes a reference location 402 located centrally in the system 400. Other reference locations may be modeled, including using one of the devices 12, 12A, 12B as a reference location. For description purposes, assume that the arrows 404, 406, 408 respectively represent the centerline axis of the field of view of each device 12, 12A, 12B.

Figure 5:
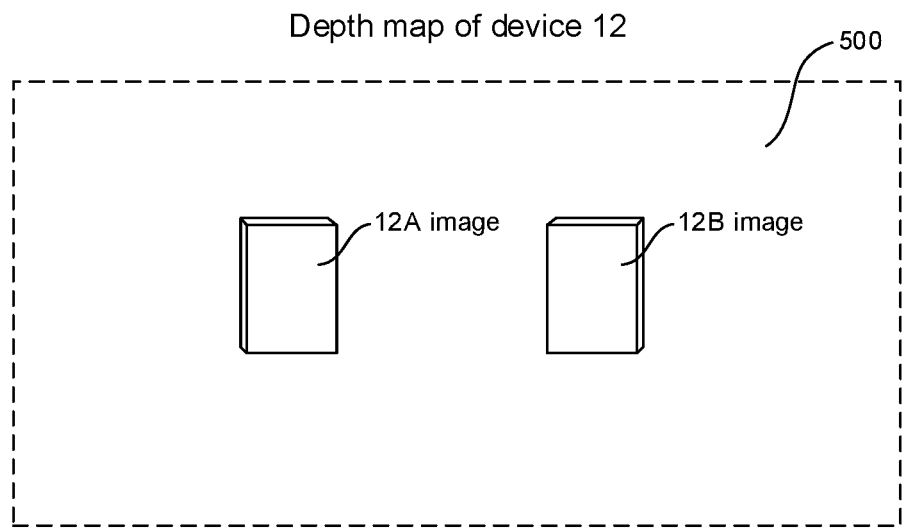
FIG. 5 schematically shows a depth map as generated by a first device in FIG. 4.
Figure 6:
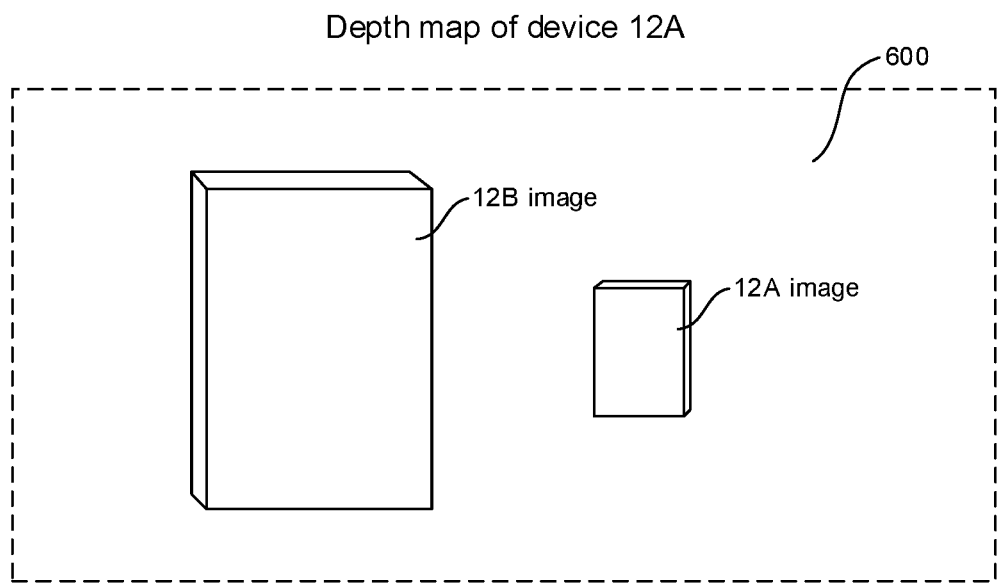
FIG. 6 schematically shows a depth map as generated by a second device in FIG. 4.
Figure 7:
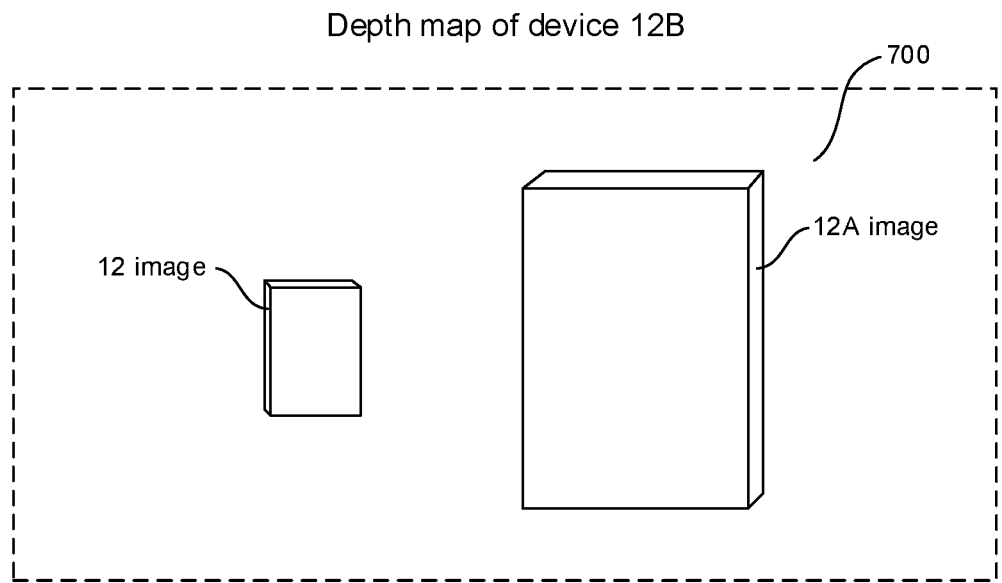
FIG. 7 schematically shows a depth map as generated by a third device in FIG. 4.

With the above description of FIG. 4 in mind, FIGS. 5-7 respectively show depth maps 500, 600, 700 generated by each device 12, 12A, 12B of the other devices in its FOV. Some of the images are larger than others because the device corresponding to the larger image is closer to the imaging device than the device corresponding to the smaller image. The depth maps can be 3D depth maps as shown, and the relative locations of the devices are known to the other devices according to further description below. Thus, each depth map includes not only the images of the other devices but their relative locations with respect to the imaging device, which knows the direction its respective centerline axis is in and thus the angular offset of each image from that centerline axis. The absolute locations of the devices may be determined if desired using, e.g., the absolute location of any one of the devices using, for instance, its GPS location.

Distance to each imaged device may be determined by correlating the size of its image to distance. For example, since the size of each device can be known and preprogrammed into each of the devices, a reference image size, e.g., height, can be correlated with a reference distance. Linear interpolation can be used to then associate smaller image sizes than the reference size with greater distances than the reference distance and larger image sizes than the reference size with lesser distances than the reference distance.

Figure 8:
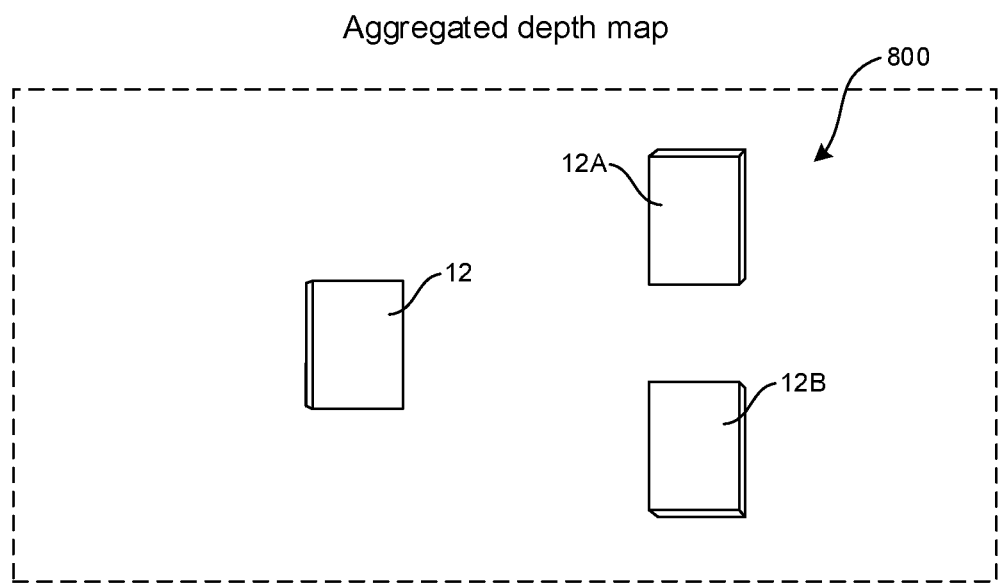
FIG. 8 schematically shows an aggregate depth map generated using the depth maps of FIGS. 5-7.

The depth maps 500, 600, 700 are aggregated into a single aggregate depth map 800 referenced to the reference location 402 in FIG. 4. The aspects of each image in the aggregate depth map 800 are altered as appropriate for the angle and distance each device is from the reference location 402. This may be done because each of the three devices in the example shown is present in two of the three depth maps, and presents a different aspect in each depth map the device appears in. One or more of the processors described herein can execute a graphics engine to access the multiple aspects of each imaged device and present a single image of the device with the aspect it would present when viewed from the reference point 402, as shown in the aggregated depth map 800 of FIG. 8.

Figure 9:
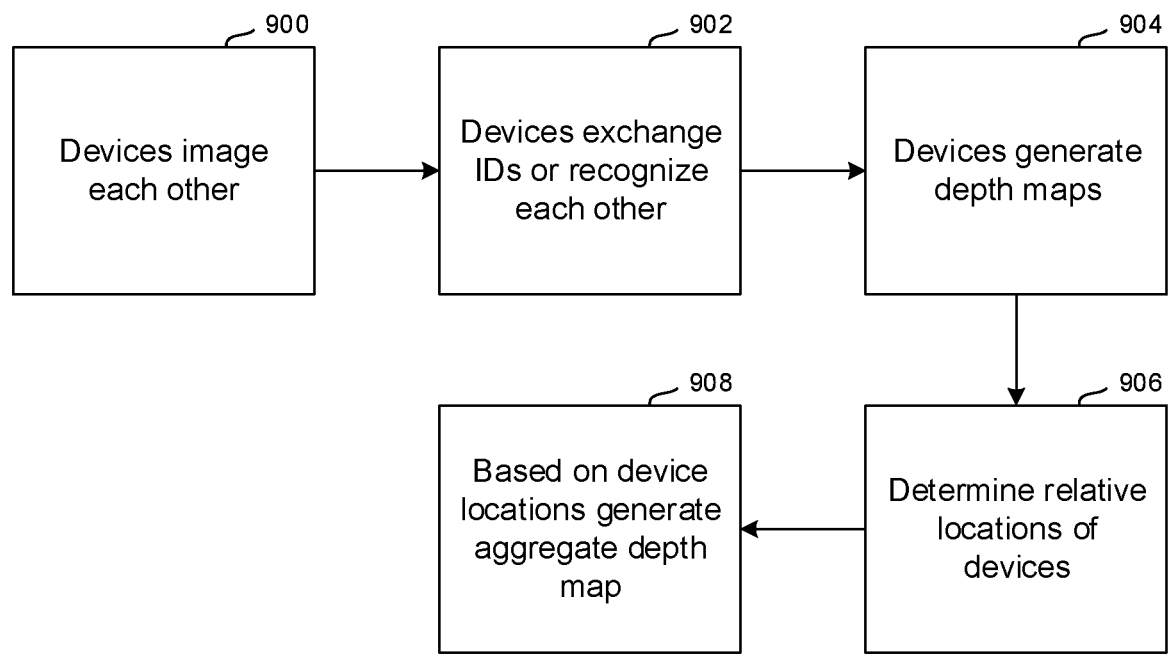
FIG. 9 is a flow chart of example logic for generating an aggregated depth map.

FIG. 9 illustrates further. Commencing at block 900, the devices 12, 12A, 12B image each other and at block 902 may exchange identifications or otherwise recognize each other using image recognition, so that each device can know the, e.g., the size of the other devices (based on ID) and the relative locations of the devices relative to the imaging device. Additionally, if desired one or more objects in the field of view of each camera can be used to help stitch the images together by referencing specific/common points. In other words, the devices can exchange information such as image information or image recognition information derived from executing image recognition algorithms on the image to inform other devices of one or more non-CE device objects (such as, e.g., a pen, a projector, a chair, etc.) in the FOV of the device. Each device may then compare the received information from other devices to determine if the same object(s) are in its FOV and in this way use commonly recognized objects as reference points in knowing what the FOV of the other device cameras is.

At block 904 the depth maps 500-700 are generated by the respective devices by imaging reflections of the ranging laser light. The locations of the devices are determined at block 906 using example principles above, and based on the device locations and the reference location for the aggregated depth map, the aggregated depth map 800 is generated as described above.

Figure 10:
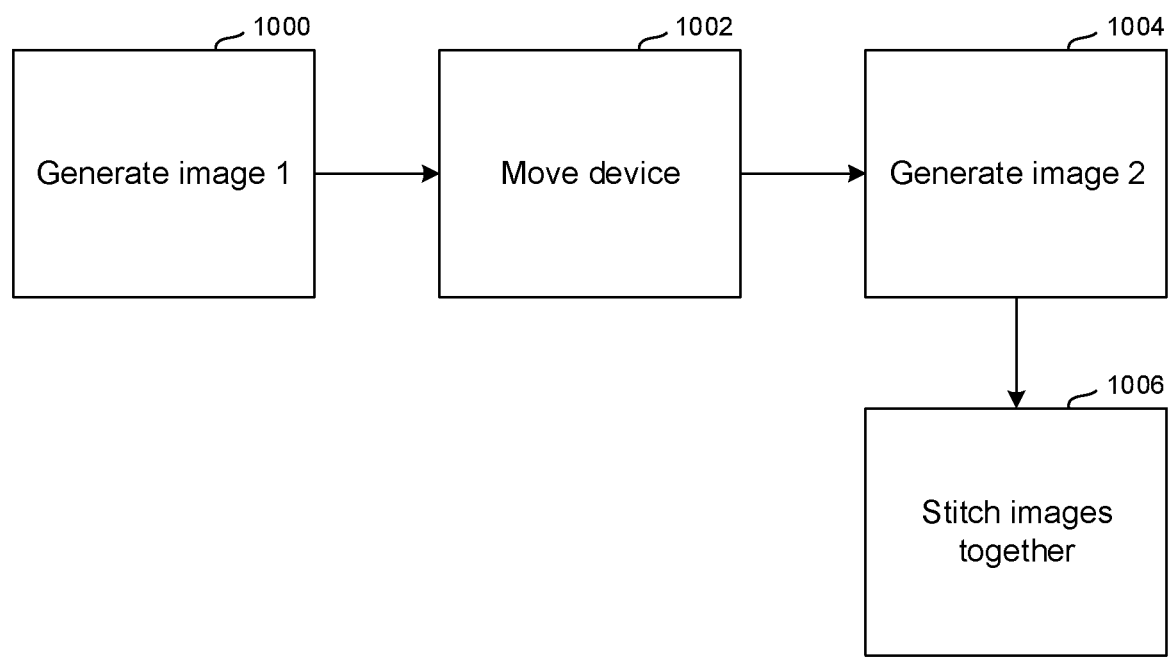
FIG. 10 is a flow chart showing logic for using a single moving device to capture spatially-separated images that can be stitched together.

In another embodiment, synthetic 3D depth mapping may be executed using the principles above using only a single camera. FIG. 10 illustrates. Commencing at block 1000, one of the 12, 12A is used to generate a first image of others of the devices. The device is then physically moved to another location at block 1002, still within line of sight of the objects in the first image, and a second image generated by the device at block 1004. At block 1006 the first and second images are stitched together according to principles above. Note that while FIG. 10 shows only two images separated by a device movement step, it is to be understood that additional images may be taken with device movement between successive images to be stitched together.

Figure 11:
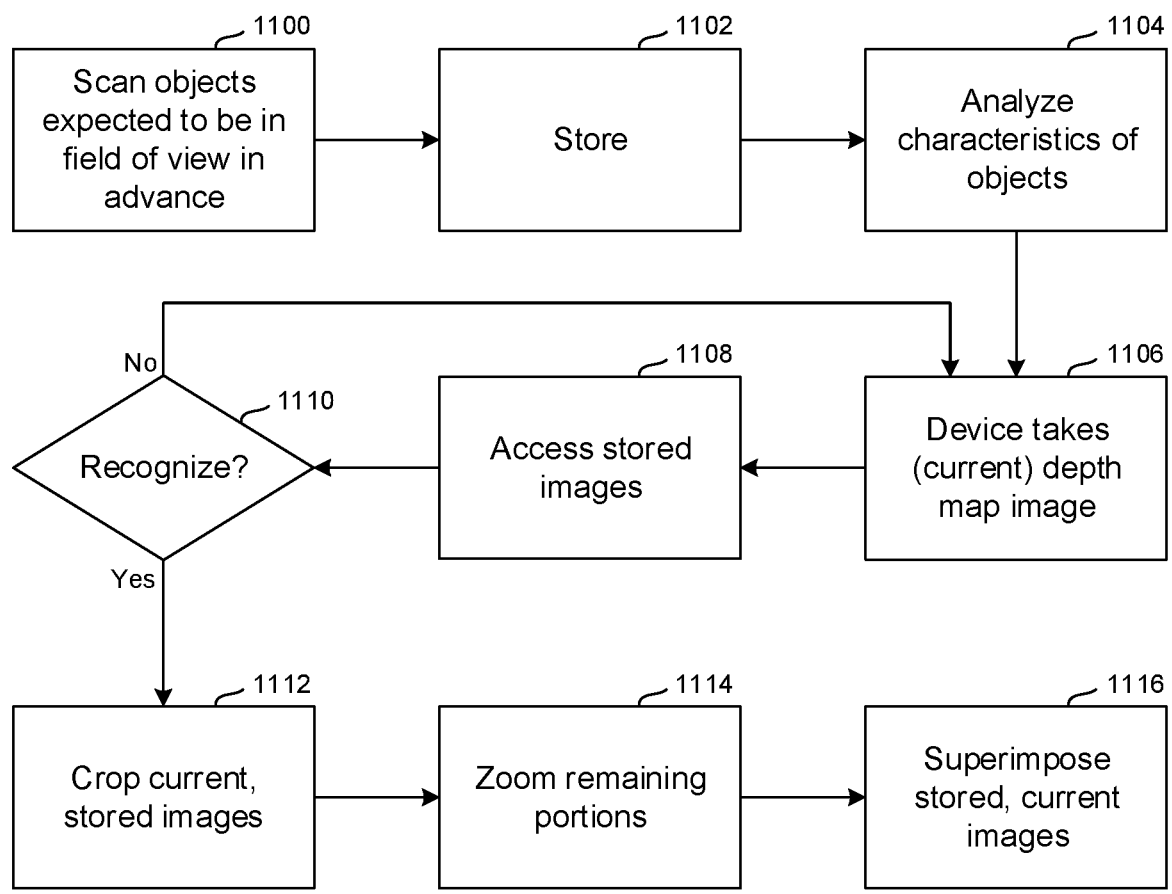
FIG. 11 is a flow chart of example logic for using super-resolution to improve a 3D depth map.

FIG. 11 illustrates that for a given indoor usage environment, many objects expected to be the relevant field of view of a device during later encounters requiring depth maps according to principles above (such as plural devices 12, 12A, etc.) can be scanned in advance at block 1100. The resulting images are stored at block 1102. Note that the stored image may be, among other examples, an image per se as well as a "representation" of a shape or only a portion of an image. Thus, the stored image may be as simple as a radiused corner of an object, so the system can fill in the pixels by looking at the actual image, and what a close representation may look like and fill in the missing pixels.

The stored images, if desired, are analyzed at block 1104 to, e.g., determine and record characteristics of objects in the images, such as the shapes and edges of objects in the image(s). These characteristics can be cataloged in data storage.

Later, when a device generates a current image of objects in space at block 1106, the logic may proceed to block 1108 to access the stored images and catalogued characteristics from blocks 1102 and 1104. Image recognition, for instance, may be employed at state 1110 to determine whether any of the stored images with their characteristics match, within a matching criteria, the current image generated at block 1106. This matching is assisted because the edges and shapes of the objects in the stored images are known and hence this "known" information can be used to assist the depth map video processing.

When a match is returned, the logic may, if desired, move to block 1112 to remove a portion of one or both images to render cropped images, in some embodiments showing only the object in the current image from block 1106 and the matching object from the stored image from block 1102. The cropped images may be digitally zoomed at block 1114 by, e.g., expanding the remaining image pixels to fill the original image area. Then, the zoomed images (or, when cropping is not used, the full original current and stored image) may be combined at block 1116 by superimposing them on each other to render a modified zoomed image that has higher resolution than any of the images from which it is derived. In example implementations, the superimposition may be done using super-resolution principles such as those disclosed in any of the incorporated patents referenced herein. The modified zoomed image may then be presented on a display or otherwise used for, e.g., navigation of a mobile computing device 12 moving among other objects 12A.

As understood herein, if super-resolution techniques are used that require relative motion between successive images, this requirement may be satisfied by the movement of the device generating the current image at block 1106. If motion calculation consequently is required, motion estimation algorithms may be employed. For example, a simple algorithm might be to estimate motion using groups of pixels in each image that remain substantially unchanged in value except for their relative positions within the images, with motion vectors being derived directly from the motion of the groups of pixels from image to image. The superimposition techniques may use Bayesian or Kalman filtering techniques in rendering the final, modified zoomed image.

Present principles can be used in an indoor setting. It may or may not be on a flat surface. Given the preceding conditions, GPS cannot feasibly be used to determine the individual camera locations. However, since the cameras can often see several other cameras in the system, each camera can be given a unique id number and a mechanism to identify either electronically, or visually, the cameras in the field of view of another camera, the relative locations of the cameras can be calculated.

While particular techniques and machines are herein shown and described in detail, it is to be understood that the subject matter which is encompassed by the present invention is limited only by the claims.

What is claimed is:

1. A device comprising:
at least one computer medium that is not a transitory signal and that comprises instructions executable by at least one processor to:
generate, using a first device, at least a first current image of at least a second device in a field of view of a camera;
the first image being a first 3D depth map;
access a data structure of stored images;
responsive to identifying a match between the first image and a first stored image in the data structure, combine the first image and the first stored image to render a modified depth map;
aggregate the modified depth map with a modified depth map generated using images taken by the second device to render an aggregated depth map for a reference location that is distanced from a location of the first device at least in part by altering images in the aggregated depth map based at least in part on an angle and distance of the first and second devices from the reference location; and identify the match between the first image and a first stored image at least in part using at least one stored characteristic of the first stored image.

2. The device of claim 1, wherein the stored characteristic includes a shape of an object in the first stored image.

3. The device of claim 1, wherein the stored characteristic includes an edge of an object in the first stored image.

4. The device of claim 1, wherein the instructions are executable to:
combine the first image and the first stored image by superimposition to render the modified depth map, the modified depth map having a higher resolution than the depth map established by the first image.

5. The device of claim 4, wherein superimposition of the first image and first stored image are undertaken using super-resolution.

6. The device of claim 1, wherein the instructions are executable to:
remove a portion of at least one of the first image, first stored image to render a respective cropped image prior to combining the first image and the first stored image to render the modified depth map.

7. An assembly comprising:
plural computerized devices;
each computerized device comprising at least one laser emitter configured to output signals useful for generating at least one three dimensional (3D) depth map;
a first one of the computerized devices being programmed with instructions to:
generate at least a first current image of at least one object in a field of view of a camera associated with the first one of the computerized devices;
access a data structure of stored images;
responsive to identifying a match between the first image and a first stored image in the data structure, combine the first image and the first stored image to render a modified three dimensional (3D) depth map at least in part by altering images in the 3D depth map based at least in part on respective angles and distances of the computerized devices from a reference location;
identify the match between the first image and a first stored image at least in part using at least one stored characteristic of the first stored image.

8. The assembly of claim 7, wherein the stored characteristic includes a shape of an object in the first stored image.

9. The assembly of claim 7, wherein the stored characteristic includes an edge of an object in the first stored image.

10. The assembly of claim 7, wherein the instructions are executable to:
combine the first image and the first stored image by superimposition to render the modified depth map, the modified depth map having a higher resolution than the first image.

11. The assembly of claim 10, wherein superimposition of the first image and first stored image are undertaken using super-resolution.

12. The assembly of claim 7, wherein the instructions are executable to:
remove a portion of at least one of the first image, first stored image to render a respective cropped image prior to combining the first image and the first stored image to render the modified depth map.

13. A method comprising:
using images from a first motorized mobile object, generating a first three dimensional (3D) depth map of at least a second motorized mobile object in space;
using images from the second motorized mobile object, generating a second dimensional (3D) depth map of at least the first motorized mobile object in space;
generating an aggregate 3D depth map from the first and second 3D depth maps referenced to a location spaced from at least the first motorized mobile object at least in part by altering images in the aggregate 3D depth map based at least in part on respective angles and distances of the first and second motorized mobile objects from the location.

14. The method of claim 13, comprising:
identifying a match between the at least one of the 3D depth maps and a first stored image in the data store and responsive thereto, combining the at least one of the 3D depth maps and the first stored image to render the modified 3D depth map.

15. The method of claim 13, comprising:
identifying a match between the at least one of the 3D depth maps and a first stored image at least in part using at least one stored characteristic of the first stored image.

16. The method of claim 15, wherein the stored characteristic includes a shape of an object in the first stored image.

17. The method of claim 15, wherein the stored characteristic includes an edge of an object in the first stored image.

18. The method of claim 13, wherein the combining includes combining the at least one of the 3D depth maps and the first stored image by superimposition to render the modified depth map.

* * * * *